United States Patent
Sada et al.

(10) Patent No.: US 9,249,981 B2
(45) Date of Patent: Feb. 2, 2016

(54) CONDENSATE OVERFLOW DETECTION DEVICE

(71) Applicants: Jonathan M. Sada, Lawrenceville, GA (US); Keith H. Platt, Snellville, GA (US)

(72) Inventors: Jonathan M. Sada, Lawrenceville, GA (US); Keith H. Platt, Snellville, GA (US)

(73) Assignee: DiversiTech Corporation, Conyers, GA (US)

( * ) Notice: Subject to any disclaimer, the term of this patent is extended or adjusted under 35 U.S.C. 154(b) by 386 days.

(21) Appl. No.: 14/039,963

(22) Filed: Sep. 27, 2013

(65) Prior Publication Data

US 2015/0090349 A1   Apr. 2, 2015

(51) Int. Cl.
| | |
|---|---|
| F24F 11/00 | (2006.01) |
| F24F 11/02 | (2006.01) |
| G01F 23/30 | (2006.01) |
| F24F 13/22 | (2006.01) |

(52) U.S. Cl.
CPC .............. *F24F 11/001* (2013.01); *G01F 23/30* (2013.01); *F24F 13/22* (2013.01); *F24F 2011/0054* (2013.01); *Y10T 137/7287* (2015.04)

(58) Field of Classification Search
CPC ............................................. F24F 2011/0054
USPC ......................................................... 73/313
See application file for complete search history.

(56) References Cited

U.S. PATENT DOCUMENTS

| | | | | |
|---|---|---|---|---|
| 3,110,161 A | * | 11/1963 | Maleck | F24F 13/22 200/61.04 |
| 4,998,412 A | * | 3/1991 | Bell | F24F 13/22 134/166 C |
| 5,069,042 A | * | 12/1991 | Stuchlik, III | F24F 13/22 4/679 |
| 5,293,894 A | * | 3/1994 | Fleischmann | F04F 10/00 137/135 |
| 5,522,229 A | * | 6/1996 | Stuchlik, III | E03C 1/28 340/620 |
| 5,694,785 A | * | 12/1997 | Balentine | F24F 13/22 62/274 |
| 5,965,814 A | * | 10/1999 | French | F24F 11/0086 307/118 |
| D416,076 S | | 11/1999 | Okitsu | |
| 6,322,326 B1 | * | 11/2001 | Davis | F04D 13/08 417/279 |
| 6,362,742 B1 | * | 3/2002 | Serenil, Jr. | F24F 11/001 200/61.2 |
| 6,718,788 B1 | * | 4/2004 | Shuck | B21D 51/18 220/571 |
| 6,817,194 B1 | * | 11/2004 | Leach | F24F 13/222 62/150 |
| 7,067,750 B1 | * | 6/2006 | Cantolino | H01H 35/18 200/84 R |

(Continued)

OTHER PUBLICATIONS

Applicant hereby notifies the Examiner of related U.S. Appl. No. 29/465,482, filed Aug. 28, 2013, which is also owned by Applicant.

*Primary Examiner* — Laura Martin
*Assistant Examiner* — Herbert K Roberts
(74) *Attorney, Agent, or Firm* — Bryan W. Bockhop; Bockhop & Associates, LLC

(57) ABSTRACT

A condensate overflow detection device includes a frame, a housing, an affixing device, a surface placement mechanism, a float and an actuator. The housing has a bottom and a plurality of pan engagement side surfaces extending upwardly from the bottom, each of which is disposed at a different angle relative to the bottom surface. The housing defines a vent structure passing therethrough that allows water to pass into the housing. The affixing device clamps a pan engagement side surface to a sidewall of a secondary condensate pan. The surface placement mechanism places one of the pan engagement side surfaces opposite from the affixing device. The float, disposed within the housing, has a first position when no water has entered the housing and a second position when a predetermined level of water has entered the housing. The actuator causes an event when the float is in the second position.

21 Claims, 3 Drawing Sheets

(56) References Cited

U.S. PATENT DOCUMENTS

| | | | |
|---|---|---|---|
| 7,191,649 B1* | 3/2007 | Coogle | H01H 36/02 73/313 |
| D562,436 S | 2/2008 | Kato et al. | |
| D603,015 S | 10/2009 | Matsumura | |
| D603,016 S | 10/2009 | Matsumura | |
| D615,618 S | 5/2010 | Someya | |
| 7,710,283 B1* | 5/2010 | Cantolino | B60H 1/3233 210/321.6 |
| D622,350 S | 8/2010 | Gramegna et al. | |
| D637,270 S | 5/2011 | Nicolia et al. | |
| 7,967,267 B1* | 6/2011 | Cantolino | F24F 13/222 248/213.2 |
| 8,151,580 B1* | 4/2012 | Cantolino | G01F 23/241 62/150 |
| 8,169,314 B2* | 5/2012 | Cantolino | F24F 13/222 340/506 |
| D677,363 S | 3/2013 | Norlander et al. | |
| D691,701 S | 10/2013 | Iranyi et al. | |
| D691,702 S | 10/2013 | Iranyi et al. | |
| D706,395 S | 6/2014 | Opfer et al. | |
| 2002/0023445 A1* | 2/2002 | Sul | F24F 3/153 62/188 |
| 2002/0124582 A1* | 9/2002 | Oakner | F24F 13/222 62/150 |
| 2002/0180071 A1* | 12/2002 | Stanek | F24F 6/00 261/26 |
| 2003/0221439 A1* | 12/2003 | Bush | F24F 13/222 62/285 |
| 2005/0138939 A1* | 6/2005 | Spanger | F24F 13/222 62/150 |
| 2005/0138940 A1* | 6/2005 | Spanger | F24F 13/222 62/150 |
| 2005/0166613 A1* | 8/2005 | Oakner | F24F 13/222 62/150 |
| 2006/0042918 A1* | 3/2006 | Cantolino | H01H 35/18 200/84 R |
| 2007/0169495 A1* | 7/2007 | Thomas | F24F 13/222 62/285 |
| 2007/0169496 A1* | 7/2007 | Rios | F24F 13/222 62/285 |
| 2007/0169501 A1* | 7/2007 | Rios | F24F 13/222 62/286 |
| 2007/0271935 A1* | 11/2007 | Robinson | F24F 13/222 62/150 |
| 2008/0000250 A1* | 1/2008 | Cantolino | F24F 13/222 62/285 |
| 2009/0064698 A1* | 3/2009 | Spanger | F24F 13/222 62/280 |
| 2009/0158934 A1* | 6/2009 | Jang | F24F 13/1406 96/189 |
| 2009/0229784 A1* | 9/2009 | Rohr | F24F 13/222 165/11.1 |
| 2009/0243535 A1* | 10/2009 | Erdmann et al. | H02P 3/18 318/813 |
| 2010/0050756 A1* | 3/2010 | Stewart | F24F 13/22 73/114.55 |
| 2010/0052921 A1* | 3/2010 | Cantolino | F24F 13/222 340/620 |
| 2011/0085917 A1* | 4/2011 | Ward | F04D 13/16 417/36 |
| 2011/0308636 A1* | 12/2011 | Kaiser | F24F 13/222 137/101.27 |

* cited by examiner

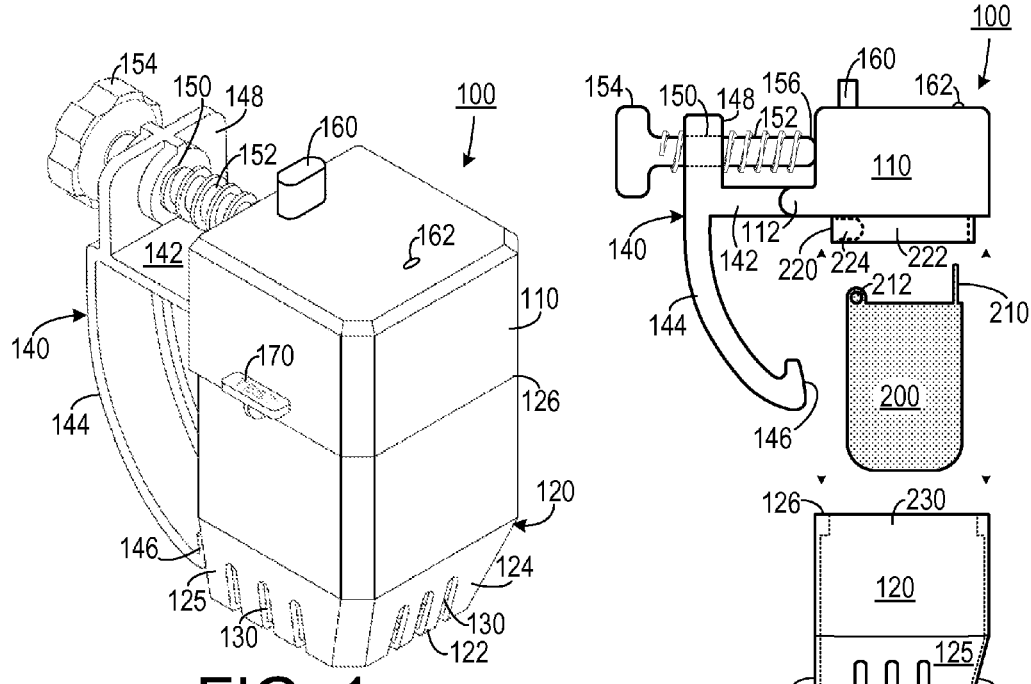
FIG. 1
FIG. 2
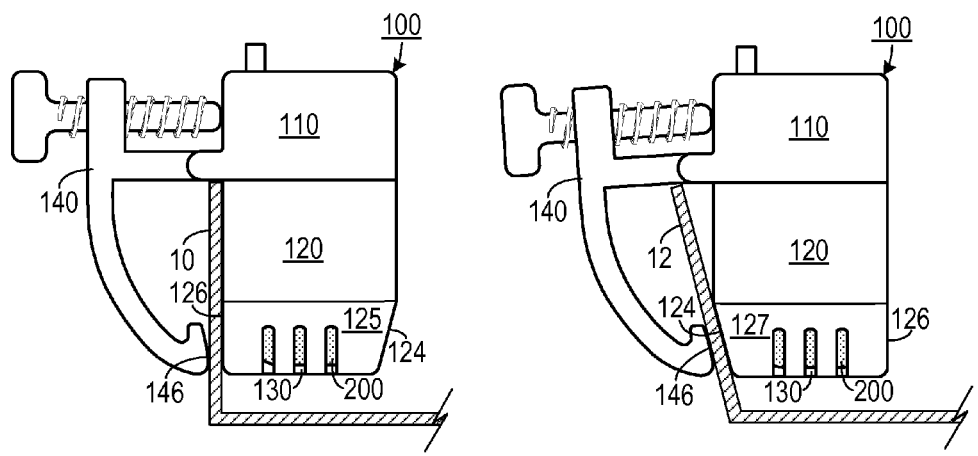
FIG. 3A
FIG. 3B

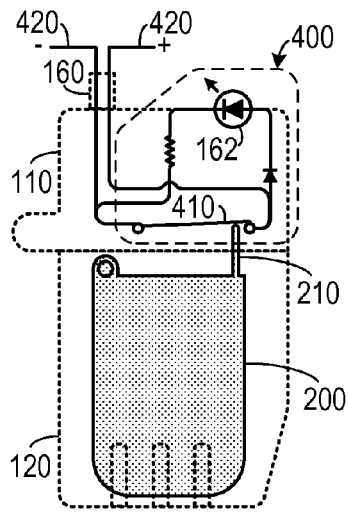
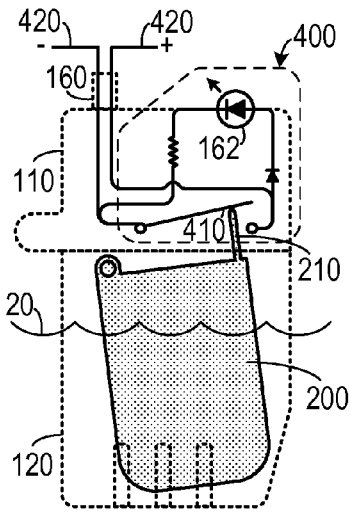
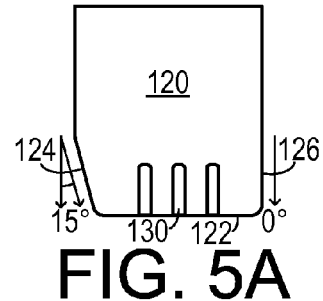
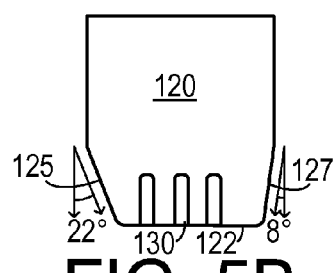
FIG. 4A
FIG. 4B
FIG. 5A
FIG. 5B
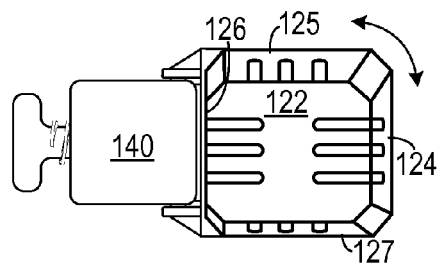
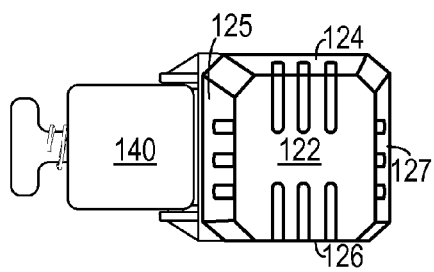
FIG. 6A
FIG. 6B
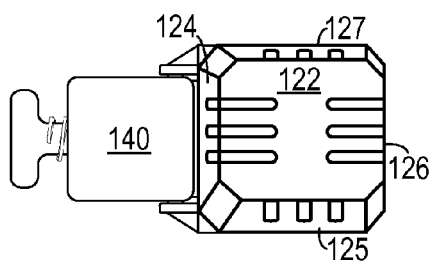
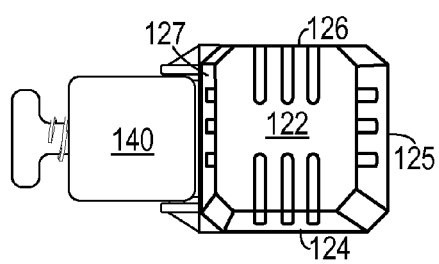
FIG. 6C
FIG. 6D

CONDENSATE OVERFLOW DETECTION DEVICE

BACKGROUND OF THE INVENTION

1. Field of the Invention

The present invention relates to condensate overflow detection devices and, more specifically, to a condensate overflow detection device adapted to fit a variety of condensate pan types.

2. Description of the Related Art

A typical central air conditioner system includes an evaporator unit disposed inside of the building being cooled. The evaporator unit includes a refrigerant coil, which absorbs heat from air flowing through the coil. Water vapor condenses on the coil as the coil cools the air. Water droplets forming on the coil through condensation coalesce and eventually drip off of the coil into a primary condensate pan. Water in this pan usually is either drained or pumped to a location outside of the building. However, most systems include a secondary condensate pan below the primary condensate pan that is configured to receive water in case water is not properly evacuated from the primary condensate pan.

It is important to detect water accumulation in the secondary condensate pan, as failing to do so could result in water damage to the building being cooled. One method of detecting water build-up in the secondary condensate pan is to place a float switch detector in the pan that disables the air conditioning unit upon detection of water accumulation. Such a detector is typically attached to the circumferential wall of a pan and includes a float that opens a switch as a result of being pushed up by water.

Secondary condensate pans include a flat portion and a peripheral wall. The peripheral walls of many systems are disposed at 90° relative to the flat portion. However, some peripheral walls are disposed at different angles. In many cases, when a detector is affixed to a wall that has an angle relative to the flat portion that is different than 90°, its float is oriented at the same angle as the wall. When a detector is disposed at an angle that is not normal to the floor, it will require more water in the secondary condensate pan to deactivate an air conditioner than a detector that is disposed normal to the floor.

Therefore, there is a need for a detector that maintains the float in an upright position irrespective of the angle of the wall of the secondary condensate pan.

SUMMARY OF THE INVENTION

The disadvantages of the prior art are overcome by the present invention which, in one aspect, is a condensate overflow detection device for placement in a secondary condensate pan having a sidewall, that includes a frame, a housing, an affixing device, a surface placement mechanism, a float and an actuator. The housing has a top surface, a bottom surface and a plurality of pan engagement side surfaces extending upwardly from the bottom surface. Each of the plurality of pan engagement side surfaces is disposed at a different angle relative to the bottom surface. The housing defines a vent structure adjacent to the bottom surface and passing therethrough that allows water to pass into the housing. The affixing device clamps a selected one of the pan engagement side surfaces to the sidewall of the secondary condensate pan. The surface placement mechanism places any selected one of the plurality of pan engagement side surfaces opposite from the affixing device. The float is disposed within the housing. The float has a first position when no water has entered the housing and a second position, different from the first position, when a predetermined level of water has entered the housing. The actuator causes a predetermined event when the float is in the second position.

In another aspect, the invention is a condensate overflow detector for placement in a secondary condensate pan having a sidewall and associated with a condensing device. A frame has a pivot projection extending from one side. A housing has a top surface, a bottom surface and four pan engagement side surfaces extending upwardly from the bottom surface. Each pan engagement side surface is disposed at a different angle relative to the bottom surface. The housing is rotatable relative to the frame so as to be able to position any selected one of the engagement side surfaces under the pivot projection extending from the frame. The housing defines a vent structure adjacent to the bottom surface and passing therethrough that allows water to pass into the housing. An adjustable clamp is coupled to the pivot projection extending from the frame and affixes a selected one of the engagement side surfaces to the sidewall of the secondary condensate pan. A float is disposed within the housing. The float has a first position when no water has entered the housing and a second position, different from the first position, when a predetermined level of water has entered the housing. An electronic circuit detects the float being in the second position and interrupts operation of the condensing device when the float is in the second position.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1 is a perspective view of one embodiment of a condensate overflow detection device.

FIG. 2 is an exploded view of a condensate overflow detection device.

FIG. 3A is a side schematic view of a condensate overflow detection device affixed to a first condensate pan.

FIG. 3B is a side schematic view of a condensate overflow detection device affixed to a second condensate pan.

FIG. 4A is a schematic diagram of a condensate overflow detection device in which the float is in a first position.

FIG. 4B is a schematic diagram of a condensate overflow detection device in which the float is in a second position.

FIGS. 5A-5B are side schematic views of a housing.

FIGS. 6A-6D are bottom schematic views of a housing in different positions.

DETAILED DESCRIPTION OF THE INVENTION

Figure 7:
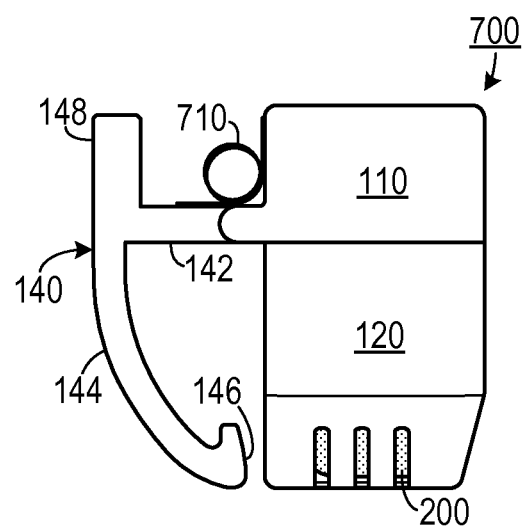
FIG. 7 is a schematic diagram an embodiment employing a spring-loaded clamp.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in"

and "on." Also, as used herein, "condensing device" means any device that condenses a liquid from a gas and can include such devices as: an air conditioner, a dehumidifier and a high efficiency combustor that extracts heat from exhaust gas.

As shown in FIGS. 1-2, one embodiment of a condensate overflow detector 100 includes a frame 110 and a housing 120 connected to the frame 110. A pivot projection 112 extends from the frame 110. The housing 120 has a top surface 126 and an opposite bottom surface 122. A plurality (which in this illustrative example includes four) pan engagement side surfaces 124-127 extend upwardly from the bottom surface 122. Each pan engagement side surface 124-127 is disposed at a different angle relative to the bottom surface 122. This facilitates, as shown in FIGS. 3A-3B, using the condensate overflow detector 100 with condensate pans having sidewalls disposed at different angles. For example, the sidewall 10 shown in FIG. 3A is at a right angle to the bottom of the pan, whereas the sidewall 12 shown in FIG. 3B is at an obtuse angle relative to the bottom of the pan. A vent structure 130 is defined by the housing 120 to allow water to pass into the housing 120. The vent structure 130 includes several large slots passing through the bottom of the housing 120. Large slots may be preferable, as they are less likely than smaller openings to become clogged by dust and debris.

An adjustable clamp 140 is pivotally coupled to the frame 110 and affixes a selected one of the engagement side surfaces 124-127 to the sidewall of the secondary condensate pan. The clamp 140 includes a lateral beam 142 that is pivotally engaged with the pivot projection 112 at a proximal end and extends to a distal end. A cantilever beam 144 depends downwardly from the distal end of the lateral beam 142 and terminates in a pan engagement edge 146. A lug member 148 extends upwardly from the distal end of the lateral beam 142 and defines a threaded hole 150 passing therethrough. A screw 152 is engaged with the threaded hole 150 and is used to apply a force that causes the lateral beam 142 to pivot downwardly so as to cause the cantilever beam 144 to force the pan engagement edge 146 toward the selected one of the plurality of pan engagement side surfaces 124-127 of the housing 120. The screw 152 has a handle end 154 and a contact end 156 that pushes against the frame 110.

As shown in FIGS. 4A-4B, a float 200 is disposed within the housing 120. The float 200 has a first position (as shown in FIG. 4A) when no water has entered the housing 120. When water 20 enters the housing 120 (as a result of the condensate pan not being properly drained), the float 200 moves to a second position (as shown in FIG. 4B). An electronic circuit 400 detects when the float 200 is in the second position and interrupts operation of the condensing device when the float 200 is in the second position. In one embodiment, the electronic circuit 400 can include a micro-switch that is opened as a result of upward force from a probe 210 extending upwardly from the top surface of the float 200 when water 20 causes upward movement of the probe 210. The switch 410 is coupled in series with a wire 420 coupled to a controller of the condensing device. When the switch 410 is open, the wire is interrupted and the controller can turn off the condensing device as a result. The wire could also be coupled to a digital controller (not shown) to cause an audible alarm to sound or to cause an alarm icon to appear on a device control screen. In one embodiment, a light emitting diode 162 can also be coupled to the switch 410 in a way to light up when the switch 410 is open, giving a local visual indication of the condensate pan filling with water. Also, a mechanical flag (not shown) can be coupled to the float to give a visual indication of the float being in the second position. A test button 170 can be coupled to a lever that manually trips the switch 410 to facilitate testing of the device 100. While the circuit 400 shown indicates either no water or the presence of a predetermined level of water, it could be modified to measure the water level continuously.

In the embodiment shown, the housing 120 is rotatable relative to the frame 110 so that any selected one of the engagement side surfaces 124-127 can be positioned under the pivot projection 112 by rotating the housing 120. As shown in FIGS. 5A-5B, one embodiment includes a first side surface 126 disposed at an angle of 90° relative to the bottom surface 122, a second side surface 127 disposed at an angle of 82° relative to the bottom surface 122, a third side surface 124 disposed at an angle of 75° relative to the bottom surface 122 and a fourth side surface 125 disposed at an angle of 68° relative to the bottom surface. These angles correspond to commonly-available condensate pans. (It is understood that many other angles may be employed without departing from the scope of the invention.) Alignment of each of these side surfaces 124-127 with the clamp 140 is shown in FIGS. 6A-6D.

Returning to FIG. 2, the frame 110 can include a circular cuff 220 depending downwardly from the frame and defining a passage 222 through which a portion of the float 200 extends. The cuff 220 can also include a pivot projection 224 that is complementary in shape to a pivot projection 212 extending upwardly from the float 200 to provide a pivoting attachment to the float 200. A circular opening 230 is defined by the top surface 126 of the housing 120 and is complimentary in shape to the circular cuff 220. The float 200 extends through the circular opening 230 into the housing 120. When assembled, the circular cuff 220 fits into the circular opening 230 so that the housing 120 is rotatable relative to the frame 110. In another embodiment, the housing 120 may be pulled off from the frame 110 and replaced with a selected orientation of the side surfaces 124-127. In yet another embodiment, the clamp 140 is removable from the frame 110 and replaceable onto any selected side of the frame 110 to pair it with a selected side surface 124-127. In yet another embodiment, the side surfaces are not discrete, but have a continuously varying curved surface in which any given point corresponds to a different condensate pan sidewall angle.

The housing 120 can include a substantially translucent material (such as acrylonitrile butadiene styrene, other suitable materials such as polycarbonate) to facilitate visual inspection of the inside of the housing 120. This allows the user to determine the state of the float 200 and to determine if debris has accumulated inside of the housing 120.

An alternate way of applying force to the clamp 140 is shown in FIG. 7. In this embodiment 700, a spring 710 is coupled to the beam 142 and the frame 110. The clamp 140 is opened by pressing lug member 148 inwardly toward the frame 110. Once released, the spring 710 applies inward force to the cantilever beam 144.

Typically the components are made through known injection molding techniques. However many other known methods of making the components can be employed.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A condensate overflow detection device for placement in a secondary condensate pan having a sidewall, comprising:
   (a) a frame;
   (b) a housing having a top surface and a bottom surface and a plurality of pan engagement side surfaces extending upwardly from the bottom surface, each of the plurality of pan engagement side surfaces disposed at a different angle relative to the bottom surface, the housing defining a vent structure adjacent to the bottom surface and passing therethrough that is configured to allow water to pass into the housing;
   (c) an affixing device configured to clamp a selected one of the pan engagement side surfaces to the sidewall of the secondary condensate pan;
   (d) a surface placement mechanism configured to place any selected one of the plurality of pan engagement side surfaces opposite from the affixing device;
   (e) a float disposed within the housing, the float having a first position when no water has entered the housing and a second position, different from the first position, when a predetermined level of water has entered the housing; and
   (f) an actuator configured to cause a predetermined event when the float is in the second position.

2. The condensate overflow detection device of claim 1, wherein the actuator comprises an electronic circuit configured to detect the float being in the second position and to cause a condensing device to cease operation when the float is in the second position.

3. The condensate overflow detection device of claim 2, wherein the float has a top surface and includes an elongated probe extending upwardly therefrom and wherein the electronic circuit comprises:
   (a) a switch, including a first pole and a second pole, that is engageable with the probe so that when the float moves into the second position, the switch is opened; and
   (b) a coupling including a first wire in electrical communication with the first pole and a second wire in electrical communication with the second pole, the coupling configured to interrupt current flow through a control wire of a condensing device when the switch is opened.

4. The condensate overflow detection device of claim 1, further comprising an aesthetic indicator that is configured to activate when the float is in the second position.

5. The condensate overflow detection device of claim 4, wherein the aesthetic indicator comprises an indicator selected from a list consisting of: a light emitting diode, an audible alarm, an icon displayed on a computer screen, a mechanical flag and combinations thereof.

6. The condensate overflow detection device of claim 1, wherein the frame includes a pivot projection and wherein the affixing device comprises:
   (a) a lateral beam that is pivotally engaged with the pivot projection at a proximal end and that extends to a distal end;
   (b) a cantilever beam depending downwardly from the distal end of the lateral beam and terminating in a pan engagement edge;
   (c) a lug member extending upwardly from the distal end of the lateral beam, the lug member defining a threaded hole passing therethrough; and
   (d) a screw, having a handle end and a contact end disposed adjacent to the frame, engaged with the threaded hole and configured to apply a force that causes the lateral beam to pivot downwardly so as to cause the cantilever beam to force the pan engagement edge toward the selected one of the plurality of pan engagement side surfaces.

7. The condensate overflow detection device of claim 1, wherein the frame includes a pivot projection and wherein the affixing device comprises:
   (a) a lateral beam that is pivotally engaged with the pivot projection at a proximal end and that extends to a distal end;
   (b) a cantilever beam depending downwardly from the distal end of the lateral beam and terminating in a pan engagement edge;
   (c) a lug member extending upwardly from the distal end of the lateral beam, the lug member defining a threaded hole passing therethrough; and
   (d) a spring configured to apply a force that causes the lateral beam to pivot downwardly so as to cause the cantilever beam to force the pan engagement edge toward the selected one of the plurality of pan engagement side surfaces.

8. The condensate overflow detection device of claim 1, wherein the housing comprises a substantially translucent material to facilitate visual inspection.

9. The condensate overflow detection device of claim 1, wherein the surface placement mechanism comprises:
   (a) a circular cuff depending downwardly from the frame, the circular cuff defining a passage through which a portion of the float extends; and
   (b) a circular opening, defined by the top surface of the housing, that is complimentary in shape to the circular cuff, the float extending through the circular opening into the housing, the circular cuff disposed within the circular opening so that the housing is rotatable relative to the frame to facilitate positioning any one of the pan engagement side surfaces opposite the affixing device.

10. The condensate overflow detection device of claim 1, wherein the plurality of pan engagement side surfaces include four surfaces, each surface disposed at a different angle relative to the bottom surface.

11. The condensate overflow detection device of claim 10, wherein the four surfaces comprise: a first surface disposed at an angle of 90° relative to the bottom surface, a second surface disposed at an angle of 82° relative to the bottom surface, a third surface disposed at an angle of 75° relative to the bottom surface and a fourth surface disposed at an angle of 68° relative to the bottom surface.

12. The condensate overflow detection device of claim 1, further comprising a test device that is configured to simulate the float being in the second position.

13. A condensate overflow detector for placement in a secondary condensate pan having a sidewall and associated with a condensing device, comprising:
   (a) a frame having a pivot projection extending from one side;
   (b) a housing having a top surface and a bottom surface and four pan engagement side surfaces extending upwardly from the bottom surface, each pan engagement side surface being disposed at a different angle relative to the bottom surface, the housing rotatable relative to the frame so as to be configured to position any selected one of the engagement side surfaces under the pivot projection extending from the frame, the housing defining a vent structure adjacent to the bottom surface and passing therethrough that is configured to allow water to pass into the housing;
   (c) an adjustable clamp coupled to the pivot projection extending from the frame and configured to affix a selected one of the engagement side surfaces to the sidewall of the secondary condensate pan;

(d) a float disposed within the housing, the float having a first position when no water has entered the housing and a second position, different from the first position, when a predetermined level of water has entered the housing; and (e) an electronic circuit configured to detect the float being in the second position and to interrupt operation of the condensing device when the float is in the second position.

14. The condensate overflow detector of claim 13, wherein the float has a top surface and includes an elongated probe extending upwardly therefrom and wherein the electronic circuit comprises:

(a) a switch, including a first pole and a second pole, that is engageable with the probe so that when the float moves into the second position, the switch is opened; and (b) a coupling including a first wire in electrical communication with the first pole and a second wire in electrical communication with the second pole, the coupling configured to interrupt current flow through a control wire of the condensing device when the switch is opened.

15. The condensate overflow detector of claim 13, wherein the electronic circuit includes an aesthetic indicator that is configured to activate when the float is in the second position.

16. The condensate overflow detector of claim 15, wherein the aesthetic indicator comprises an indicator selected from a list consisting of: a light emitting diode, an audible alarm, an icon displayed on a computer screen and combinations thereof.

17. The condensate overflow detector of claim 13, wherein the adjustable clamp comprises:

(a) a lateral beam that is pivotally engaged with the pivot projection at a proximal end and that extends to a distal end;

(b) a cantilever beam depending downwardly from the distal end of the lateral beam and terminating in a pan engagement edge;

(c) a lug member extending upwardly from the distal end of the lateral beam, the lug member defining a threaded hole passing therethrough; and (d) a screw, having a handle end and a contact end disposed adjacent to the frame, engaged with the threaded hole and configured to apply a force that causes the lateral beam to pivot downwardly so as to cause the cantilever beam to force the pan engagement edge toward the selected one of the plurality of pan engagement side surfaces.

18. The condensate overflow detector of claim 13, wherein the housing comprises a substantially translucent material to facilitate visual determination of when the float is in the second state.

19. The condensate overflow detector of claim 13, wherein the frame comprises a circular cuff depending downwardly therefrom, the circular cuff defining a passage through which a portion of the float extends and wherein the top surface of the housing defines a circular opening that is complimentary in shape to the circular cuff, the float extending through the circular opening into the housing, the circular cuff disposed within the circular opening so that the housing is rotatable relative to the frame to facilitate positioning any one of the pan engagement side surfaces opposite the affixing device.

20. The condensate overflow detector of claim 13, wherein the four pan engagement side surfaces comprise: a first surface disposed at an angle of 90° relative to the bottom surface, a second surface disposed at an angle of 82° relative to the bottom surface, a third surface disposed at an angle of 75° relative to the bottom surface and a fourth surface disposed at an angle of 68° relative to the bottom surface.

21. The condensate overflow detector of claim 13, further comprising a test device that is configured to simulate the float being in the second position.

* * * * *